W. H. BEANES.
BAKING OVEN.
APPLICATION FILED AUG. 24, 1920.

1,394,706.

Patented Oct. 25, 1921.

Inventor
W. H. Beanes,
By H. R. Kerslake.
Attorney

UNITED STATES PATENT OFFICE.

WARWICK HENRY BEANES, OF PETERBOROUGH, ENGLAND.

BAKING-OVEN.

1,394,706. Specification of Letters Patent. Patented Oct. 25, 1921.

Application filed August 24, 1920. Serial No. 405,733.

*To all whom it may concern:*

Be it known that I, WARWICK HENRY BEANES, a subject of the King of Great Britain and Ireland, residing at Westwood Works, Peterborough, in the county of Northants, England, have invented certain new and useful Improvements Relating to Baking-Ovens, of which the following is a specification.

This invention relates to baking ovens, for bread making and other purposes, of the type comprising steam pipes forming tubular heating elements and a traveling sole plate, the latter being arranged as an endless conveyer whereon the dough portions or the like are passed from end to end of the oven and baked during the said transit.

With a long oven of the type aforesaid difficulties are experienced in obtaining and maintaining the required graduation of temperatures throughout the oven or baking chamber to insure satisfactory results. Thus, for example, in bread baking it is necessary in some instances to subject the loaves or dough pieces to a high temperature or a large amount of heat or both immediately after they are carried into the oven and to moderate the temperature or quantity or both as the loaves travel from such region to the discharge end or outlet of the oven, while in other cases the high temperature or quantity or both may be required at another portion of the baking period. The object of this invention is to provide for the heating of the oven in such manner as will insure the said temperature and quantity graduations.

The invention comprises the combination with an oven having a continuous and moving sole or baking plate, of a series of independent furnaces or fire-grates each having a group of tubular heat transmitting elements associated therewith, each of the said furnaces with its group of tubes being arranged for the heating of a particular portion or region of the oven or baking chamber.

Referring to the accompanying sheet of explanatory drawings:—

The same reference letters in the different views indicate the same or similar parts.

In the illustrated application of the invention, the series of independent furnaces or fire-grates as $a$ are arranged along one side of the oven $b$. The furnace nearest to the front or charging end $c$ of the oven and adapted for the heating of the first or high temperature region hereinbefore referred to, is of larger heating capacity relatively to the region or portion of the oven heated by said furnace, than the furnace or furnaces for the heating of the succeeding regions of the oven or baking chamber. Where three or more furnaces are employed they may all vary in size or capacity, the smallest in heating capacity being preferably the one nearest to the rear or discharge end $d$ of the oven. In like manner the number of tubes $e$ employed with the furnaces varies according to the capacity of the latter and to the required temperature to be attained and maintained in the respective regions or portions of the oven served by the respective groups of tubes.

Figure 1:
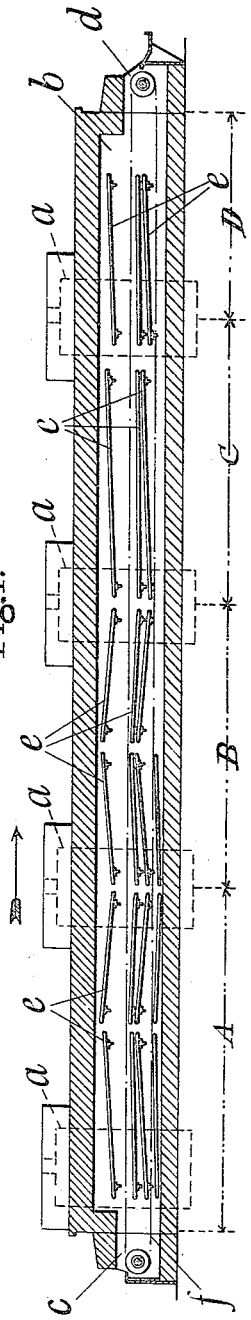
Figure 1 is a sectional elevation and Fig. 2 a sectional plan representing an oven for bread baking constructed in accordance with this invention.
Figure 2:
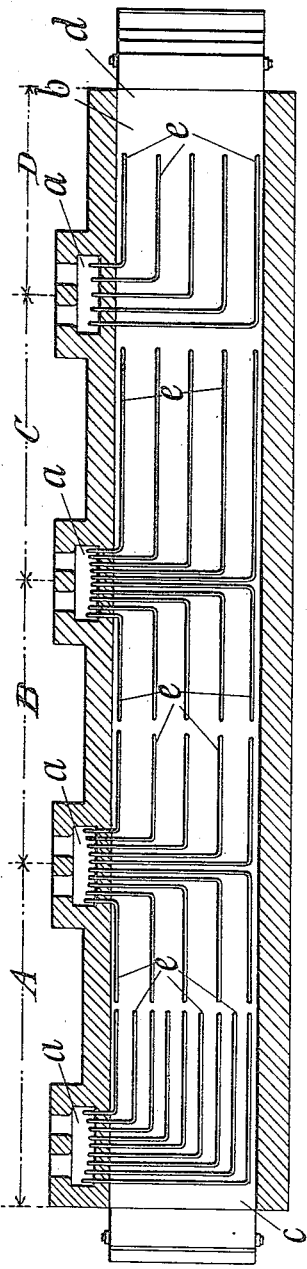
Figure 3:
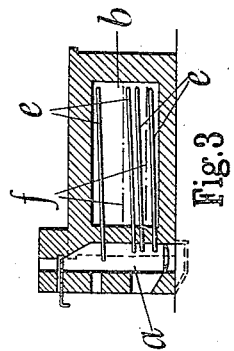
Fig. 3 is a sectional end view of the oven and one of its furnaces.

In the oven illustrated the respective heating zones or regions are indicated by the reference letters A B C D and the dotted lines between Figs. 1 and 2. The portion A, nearest the front or charging end of the oven, is the hot zone or zone of maximum heating, while the portion D, nearest the rear or discharging end of the oven is the zone of minimum heating. The portions B and C are the intermediate zones wherein the heating effect is graded between the maximum in zone A and the minimum in zone D.

The pipes or tubes $e$ may be disposed both over and under the upper or active length or run of the endless sole plate or conveyer $f$. Such upper and active length of the conveyer travels in the direction shown by the arrow above Fig. 1. Tubes may also be disposed beneath the lower or return length of the said conveyer to insure that it shall be warm enough for the reception of the loaf or dough portions placed thereon at the front or charging end *c* of the oven.

Having thus described my invention what I claim as new and desire to secure by Letters Patent is:—

In baking ovens, the combination with a continuous baking chamber and an endless conveyer extending through said chamber, of means for imparting differential heating effects in different zones of the said chamber, said means comprising a series of independent furnaces ranged along the chamber and tubular elements projecting into said furnaces and disposed in groups of varying heating capacities in the respective zones of the chamber, as set forth.

In testimony whereof I have signed my name to this specification.

WARWICK HENRY BEANES.